United States Patent
Ishida

[11] 3,771,805
[45] Nov. 13, 1973

[54] SKI BODY
[75] Inventor: Yoshikatsu Ishida, Hamamatsu, Japan
[73] Assignee: Nippon Gakki Seizo Kabushiki Kaisha, Shizuoka-ken, Japan
[22] Filed: Feb. 16, 1971
[21] Appl. No.: 115,236

[30] Foreign Application Priority Data
Feb. 19, 1970 Japan.............................. 45/16357

[52] U.S. Cl. ......................................... 280/11.13 T
[51] Int. Cl. .............................................. A63c 5/00
[58] Field of Search............... 280/11.13 T, 11.13 L, 280/11.13 R

[56] References Cited
UNITED STATES PATENTS
| | | | |
|---|---|---|---|
| 3,503,621 | 3/1970 | Schmidt et al. .............. | 280/11.13 L |
| 3,475,035 | 10/1969 | Nason .......................... | 280/11.13 L |
| 2,851,277 | 9/1958 | Holmberg et al. ........... | 280/11.13 L |
| 2,539,369 | 1/1951 | Lund............................ | 280/11.13 L |
| 2,213,903 | 9/1940 | Davidson..................... | 280/11.13 L |

FOREIGN PATENTS OR APPLICATIONS
| | | | |
|---|---|---|---|
| 622,783 | 12/1935 | Germany..................... | 280/11.13 T |
| 101,795 | 4/1963 | Norway........................ | 280/11.13 T |

Primary Examiner—Kenneth H. Betts
Assistant Examiner—Milton L. Smith
Attorney—Lerner, David & Littenberg

[57] ABSTRACT

In a ski body of a laminated construction, the core structure employed therein is divided into a forward up-turning portion made of non-foamable material and a basic core portion made of a hard type foamed resin bonded together into an integral core structure, and an upper and lower surface plates made of a reinforcing material are laminated on the upper and lower surfaces of the core structure. Preferably, the forward upturning portion of the core structure is made of ABS or polycarbonate resin, and the joining line between the two portions is so configured that the variation of the mechanical strength from one portion to the other is gradual.

2 Claims, 6 Drawing Figures

PATENTED NOV 13 1973 3,771,805

SKI BODY

BACKGROUND OF THE INVENTION

This invention relates to an improvement for a ski having a core structure made of a hard type foamed plastic resin.

Heretofore, core structure of a ski of laminated construction has been studied intensely, and it is found that a core structure made of a hard type foamed synthetic resin such as polyurethane or epoxy resin is much more advantageous over the conventional wood core material in that the former can be easily acquired, easily formed, and is well adapted to mass-production, rendering ski of uniform quality. More specifically, a foamable resin material is injected as a liquid in a metal mold of a size suitable to the desired core structure, subjected to a foaming treatment, and solidified, and by removing the thus formed core structure from the metal mold, a desired foam core structure can be obtained through one process.

However, during the molding process of the core structure made of a hard type foamed resin, extreme care should be exercised in flowing the injected resin into every corners inside of the metal mold, and if the flow of the resin is insufficient, bubbles or voids may be created in thus formed products or some part of the product might be lost, rendering the product utterly useless.

Since the core structure of ski is ordinarily provided with a thickness distribution similar to that of the completed ski, having a thick portion at the center and the thickness being gradually reduced toward both ends, the molding cavity interior of the metal mold becomes considerably narrower toward the end portions of the metal mold. Particularly in the forward end portion of the core structure, it is bent upwardly, and hence the cavity corresponding to this portion of the core structure is also bent upwardly. As a result, the flow of the material resin through the forwardly bent cavity of the metal mold tends to be irregular, and the above described defects in the plastic foam core tends to be created in this part of the core structure, weakening the mechnical strength in that portion of the core structure.

SUMMARY OF THE INVENTION

Therefore, a primary object of the present invention is to provide an improved construction of the core structure employed for a ski, whereby the above described difficulty in forming the forward portion of the core structure can be substantially eliminated.

Another object of the present invention is to provide an improved construction of the core structure employed for a ski, whereby specific cares or labor required for flowing the material resin into the forward up-turning narrowed cavity of the metal mold are made utterly unnecessary.

Still another object of the invention is to provide an improved construction of the core structure employed for a ski, whereby the mechanical strengths of the forward up-turning portion of the core structure are substantially increased.

An additional object of the invention is to provide an improved construction of the core structure made of a foamed resin, whereby the productivity thereof is substantially elevated.

These and other objects of the present invention can be achieved by an improved core structure employed for a ski, wherein the forward up-turning portion thereof is beforehand formed of ABS (acrylonitrile-butadiene-styrene) resin, polycarbonate resin, metal plate, wood plate, thermosetting resin reinforced plate, or other suitable non-foamable materials, and rest of the core structure is formed of a hard type foamed resin, the forward portion and the rest of portion being suitably bonded together into an integral core structure so that the mechanical strength along the bonded portion is gradually changed.

The nature, principle, and utility of the present invention will be more clearly understood from the following detailed description of invention when read in conjunction with the accompanying drawings wherein like parts are designated by like reference numerals.

DETAILED DESCRIPTION OF THE INVENTION

Figure 1:
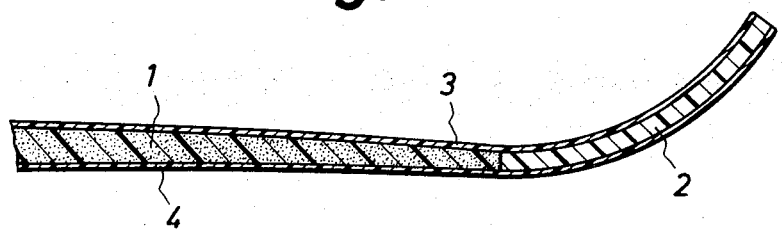
FIG. 1 is a longitudinal sectional view showing an important part of a ski according to the present invention.

Referring now to FIG. 1, there is indicated a core tructure of the ski according to the present invention which comprises a basic core portion 1 consisting of a hard type plastic foam (such as polyurethane foam, epoxy foam, or the like foamed to have an average foam ratio of from 1.4 to 2.7 times) and a forward up-turning portion 2 is, differing from the basic core portion 1, made of ABS (acrylonitrile-butadiene-styrene) resin, polycarbonate resin, a metal plate, a wood plate, or a thermosetting resin reinforced plate (such as a phenol resin reinforced plate). The core structure comprising the basic core portion 1 and the forward upturning portion 2 bonded together is, on its upper and lower surfaces, laminated with an upper surface plate 3 and a lower surface plate 4, respectively, the plates 3 and 4 consisting of, for instance, fiber reinforced plastic plate or metal plate. On the upper and lower surfaces of the thus laminated structure, an upper surface decorative plate and a lower sliding surface or sole plate are bonded to form a ski main body, and top edges, steel edges, and forward and afterward protectors are attached to suitable positions of the ski main body as in the case of a conventional ski. Since the lateral side surfaces of the ski main body are sufficiently smooth because of the existence of the foamed resin core structure, attachment of side surface plates is not necessary.

In order to produce the ski main body of the above described construction, two kinds of methods are considered, one being a method whereby a core structure is constructed beforehand with the upper and lower surface plates being laminated thereto afterward, and the other being a method whereby the formation of the core structure are carried out simultaneously.

In accordance with the former method, a separately prepared forward up-turning portion of the core structure is inserted into the corresponding forward position inside of the molding cavity of a metal mold, and then a foamable resin material is injected as a liquid into the metal mold. When the resin material is subjected to a foaming treatment and solidified, the forward up-turning portion is connected to the basic core portion, and a consolidated core structure can be obtained.

In accordance with the latter method, on the other hand, an upper surface plate and a lower surface plate both shaped into a desired configuration are placed in the cavity of a mold in a spaced apart relationship with a distance corresponding to the thickness of the core structure. A separately prepared forward up-turning portion of the core structure is then inserted in the corresponding position between the upper and lower surface plates, and spacers are placed on both sides of the upper and lower surface plates so that a molding cavity conforming to the basic core portion of the core structure is formed inside of the two plates and the spacers. With all of the plates and spacers being tightened together so that any leakage path therebetween is minimized, a hard type foamable resin material is poured into the molding cavity through an opening provided at the rear end of the mold assembly, and foamed and solidified therein so that a core structure in which the forward up-turning portion and the basic core portion are integrally connected together is obtained. Furthermore, according to this method, the upper and lower surface plates are also bonded to the core structure in a laminated manner, whereby the ski main body can be produced in one process. After the completion of the ski main body, the spacers placed at both sides of the upper and lower surface plates for maintaining a required gap therebetween are removed from the ski main body.

With the above described construction of the ski according to the present invention, it is apparent that the difficulty experienced in the conventional constructions of ski can be utterly eliminated and the mass-production of the ski can be further facilitated.

Figure 2:
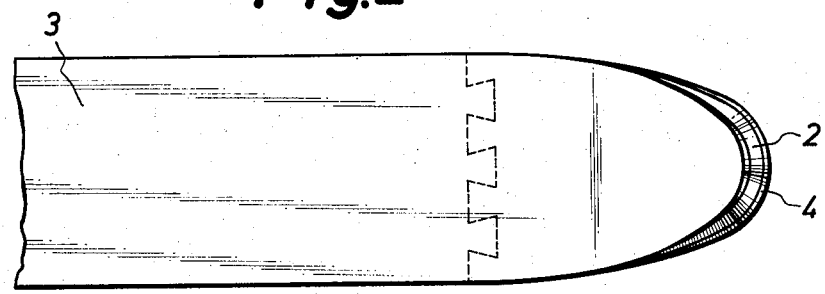
FIG. 2 is a fragmentary plan view showing the same part of the ski indicated in FIG. 1.
Figure 3:
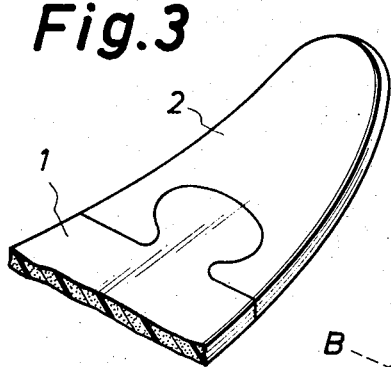
FIG. 3 to FIG. 5 are fragmentary perspective views showing forward parts of various examples of core structures each constituting an important part of a ski according to the present invention.
Figures 4, 5:
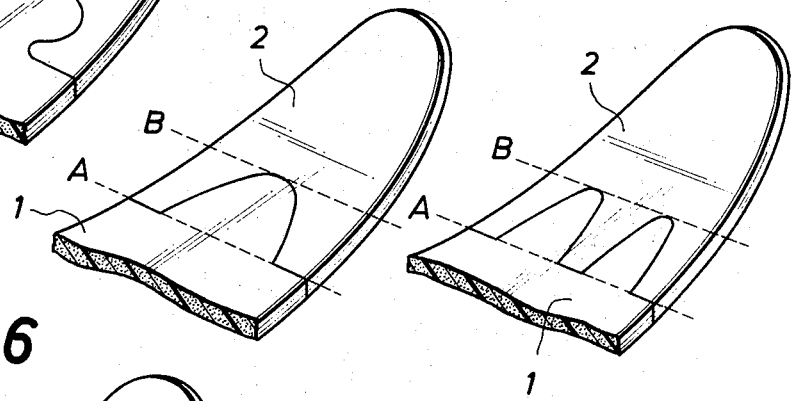

In the above described construction of ski, however, if the joining point of the forward up-turing portion and the basic core portion is simply of line-to-line abutting construction, an abrupt change is caused in the mechanical strengths of two portions, and the forward up-turning portion tends to be brocken off the core portion at the joining point. For this reason, the rearward joining edge of the forward up-turning portion may preferably be provided with a series of dovetailed configurations as shown by dotted lines in FIG. 2 or one or more of oval or parabolic shaped cut-in portions may be provided as shown in FIGS. 3 to 5. By this way, the mechanical strength of the joining portion is gradually varied from a value corresponding to a transversal position A to another value corresponding to a transversal position B as shown in FIGS. 4 and 5, whereby the possibility of the forward up-turning portion being broken off the core portion can be substantially minimized.

Figure 6:
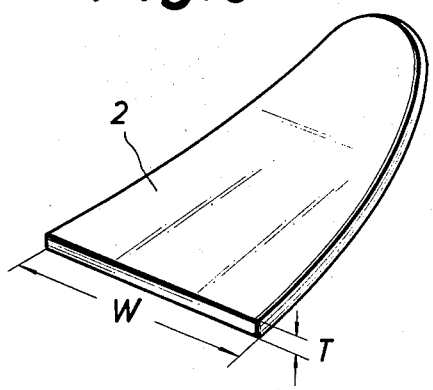
FIG. 6 is a perspective view showing the forward part of a core structure for indicating a dimension of the rearward bonding end thereof.

In ordinary cases, the joining point between the forward up-turning portion and the basic core portion is determined near the forward touch-down or ground-contacting point of the ski, and it was found that a deviation of the joining position within 10 cm forward or rearward from the touch-down point does not cause much difference in the advantageous feature of this construction. As shown in FIG. 6, the thickness T of the forward up-turning portion at its joining position is selected in a range of from 0.5 to 3 mm., and the width W of the forward portion at its joining position is substantially equal to the width of the ski body. Because of the considerably greater strength of the forward up-turning portion made of ABS resin or the like than that of the basic core portion made of a hard type foamed resin, the resistivity of the forward up-turning portion to shock or bending or twisting stress can be substantially improved regardless of its comparatively minor thickness value as indicated above.

What is claimed is:

1. A ski body of a laminated construction, comprising a core structure having a forward up-turning portion made of a non-foamable material, and a basic core portion made of a hard type plastic foam and bonded to said up-turning portion, and joining means for joining the forward up-turning portion and the basic core portion of said structure with a gradual variation of the mechanical strengths from one portion to the other, said joining means comprising a series of dovetailed portions formed therebetween, thereby substantially minimizing the possibility of the forward up-turning portion from being broken off from the core portion.

2. A ski body of a laminated construction, comprising a core structure having a forward up-turning portion made of a non-foamable material, and a basic core portion made of a hard type plastic foam and bonded to said up-turning portion, and joining means for joining the forward up-turning portion and the basic core portion of said structure with a gradual variation of the mechanical strengths from one portion to the other, said joining means comprising at least one oval or parabolic joining line formed therebetween, thereby substantially minimizing the possibility of the forward up-turning portion from being broken off from the core portion.

* * * * *